(No Model.) 2 Sheets—Sheet 1.
G. S. BURNAP.
CLEANER FOR BOLTING REEL CLOTHS.
No. 338,630. Patented Mar. 23, 1886.
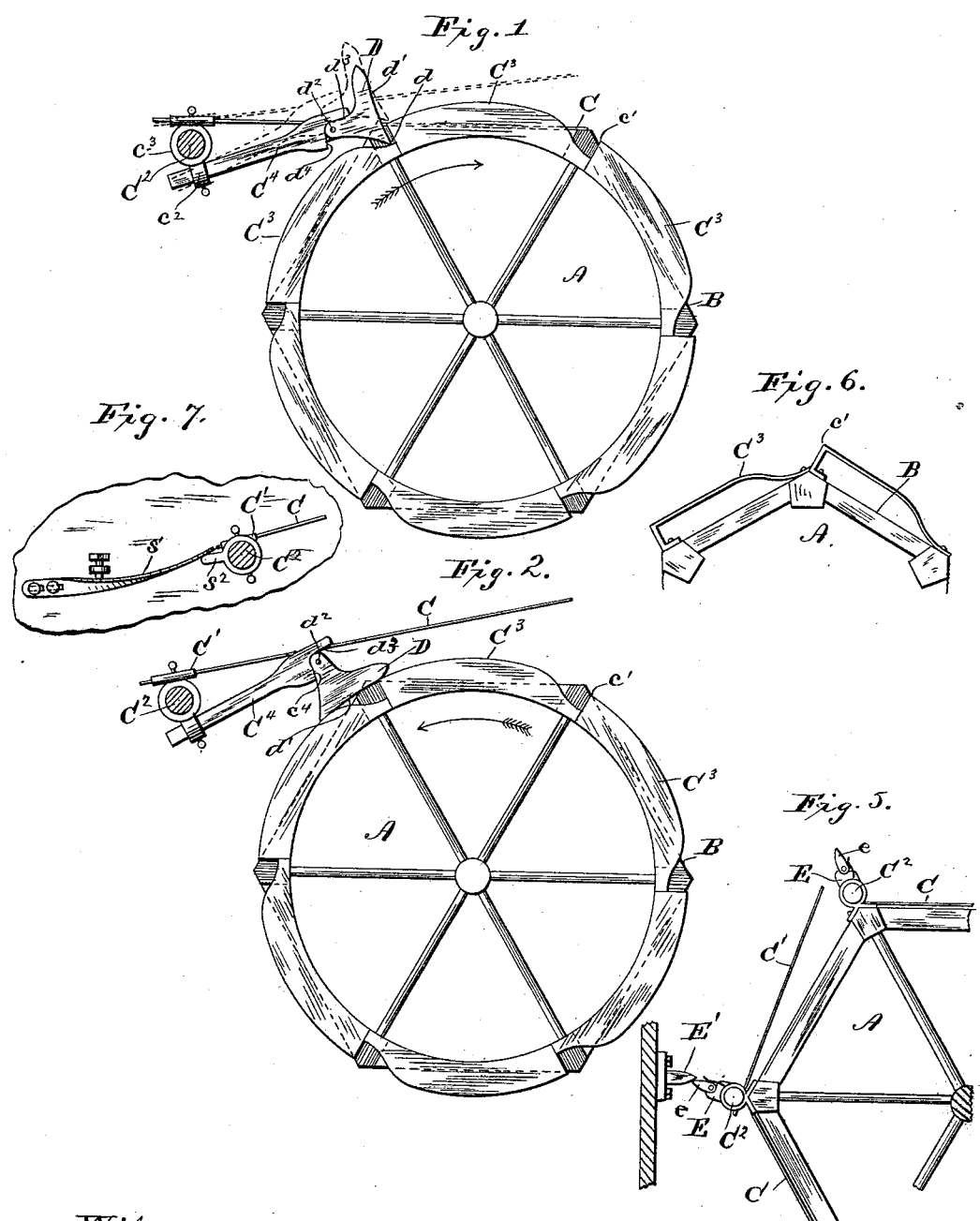

(No Model.) 2 Sheets—Sheet 2.
G. S. BURNAP.
CLEANER FOR BOLTING REEL CLOTHS.
No. 338,630. Patented Mar. 23, 1886.
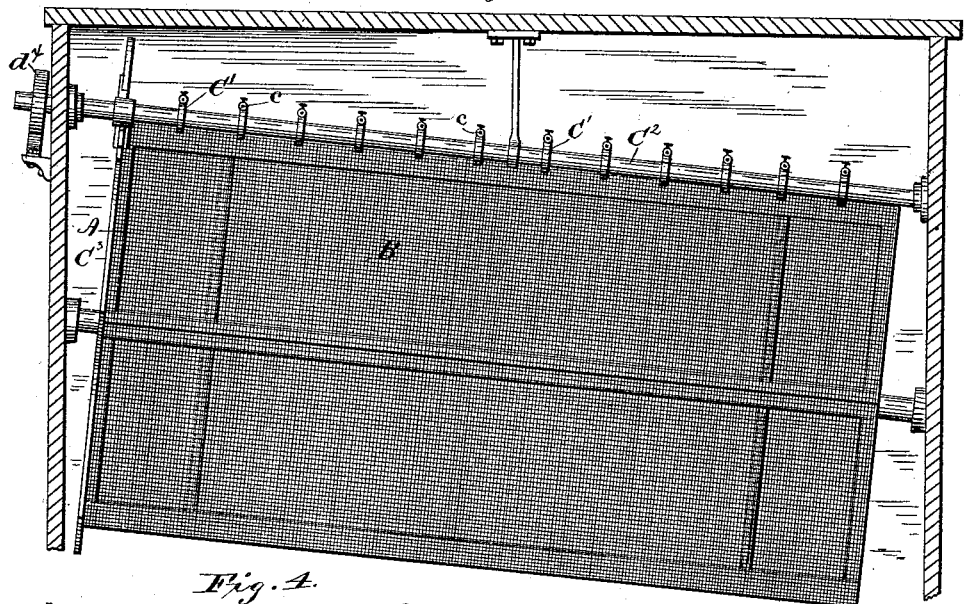
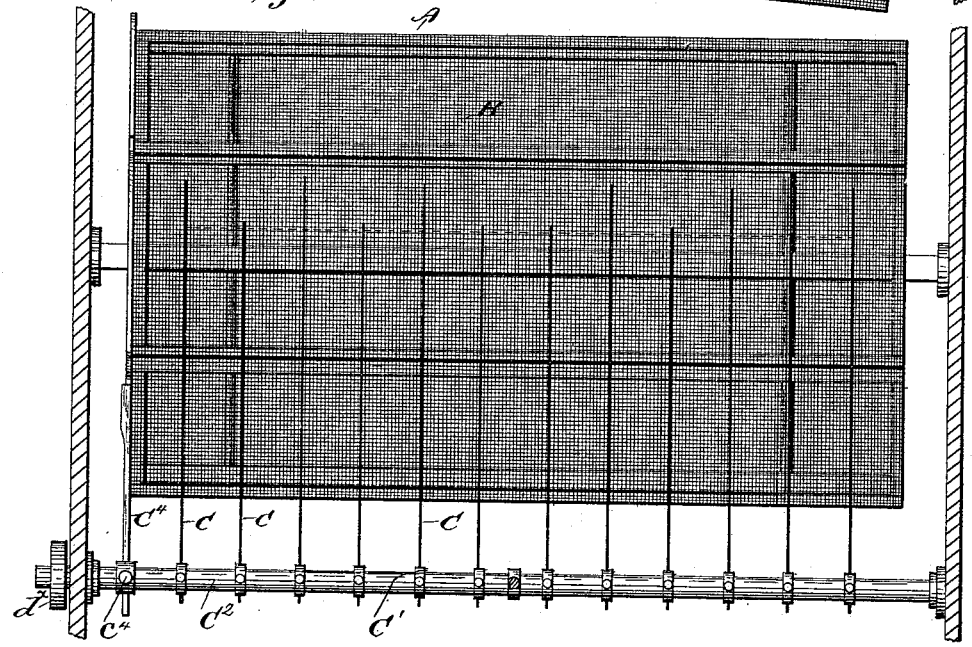
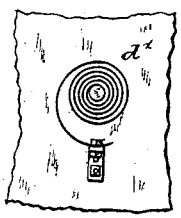
Witnesses.
Charles R. Burr
A. F. Stuart
Inventor.
George S. Burnap
by Church & Church
his Attorneys.

UNITED STATES PATENT OFFICE.

GEORGE S. BURNAP, OF MARIETTA, GEORGIA.

CLEANER FOR BOLTING-REEL CLOTHS.

SPECIFICATION forming part of Letters Patent No. 338,630, dated March 23, 1886.

Application filed May 11, 1885. Serial No. 165,071. (No model.)

*To all whom it may concern:*

Be it known that I, GEORGE S. BURNAP, of Marietta, in the county of Cobb and State of Georgia, have invented certain new and useful Improvements in Cleaners for Bolting-Reel Cloths; and I do hereby declare the following to be a full, clear, and exact description of the same, reference being had to the accompanying drawings, forming a part of this specification, and to the figures and letters of reference marked thereon.

This invention relates to certain improvements in mechanism for cleaning or freeing the meshes in the bolting-surface of a reel from adherent material tending to fill and clog the same; and it consists in the novel constructions, combinations, and arrangements of devices, as hereinafter described, and pointed out in the claims.

In the accompanying drawings, Figure 1 is an end view of a reel, showing one mode of applying my invention thereto. Fig. 2 is a similar view, illustrating the action of the mechanism when the motion of the reel is reversed. Fig. 3 is a side elevation, and Fig. 4 a plan view, of the reel and whipping attachment. Fig. 5 is an end view illustrating a modified form of the whipping mechanism. Figs. 6, 7, and 8 illustrate certain details of construction.

Similar letters of reference in the several figures indicate the same parts.

The letter A designates a reel, covered with bolting-cloth B, or other suitable material in the usual manner, said reel being mounted in bearings within a chest, as is common in this class of machines. Above the surface of the bolting-cloth B is mounted a series of whippers, C, arranged and operated in such manner that, as the reel is revolved, they shall be caused to descend with a quick motion and strike the surface of the bolting-cloth, thereby dislodging the material clinging to the bolting-cloth. These rods or whippers C may be constructed of wood, whalebone, rawhide, or metal, as may be found best adapted to co-operate with the particular bolting-surface employed, and they may, if desired, carry, or be connected together near their outer ends by, a cord or cords or a light rod or wire, as indicated by dotted lines in Fig. 4.

In order to insure a uniform stroke and application of the whippers throughout the length of the bolting-surface, rods C, of wood, metal, or other material, are each independently secured in a holder, C', adjustably fastened to a shaft or bar, C², running longitudinally above the reel, said shaft or bar C² being sustained in bearings applied either to the ends of the chest, as in Figs. 1 to 4, or mounted upon the heads of the reel, as in Fig. 5. In the former case but one set of whippers need be employed, preferably located above the reel, and in the latter as many sets as there are sections of bolting-surface. This manner of applying and securing the series of whippers C to a longitudinal shaft, C², facilitates their adjustment, removal, and repair, inasmuch as each whipper can be properly positioned by resting it upon the bolting-surface, after which they are all fixed in position by clamping their holders C' to the shaft; moreover, the sockets c on the holders C', in which the whippers are secured, permit a longitudinal adjustment of the latter, whereby the length of striking-surface can be varied, and the rods renewed or adjusted to compensate for wear.

When the shaft or bar C² carrying the whippers is supported independently of the reel, as shown in Figs. 1 to 4, it is desirable that the whippers shall strike each section of the reel in succession, and by arranging the shaft C² to one side of the reel, as shown in Fig. 1, and giving the reel a motion from left to right, the whippers as they descend are caused to strike the bolting material as it ascends, thereby equalizing the stroke.

In order that the whippers may be actuated automatically, so as to give their strokes at the proper intervals and then raise sufficiently to clear the ribs of the reel and be sustained in proper position to deliver their stroke upon the next succeeding section, there are formed upon or attached to the head of the reel a series of cam-surfaces, C³, each terminating in an abrupt shoulder, c', and to the shaft C² is secured an arm, C⁴, which rides upon said cam-surfaces C³. As the reel revolves, the arm C⁴, while resting upon the outer or more elevated portion of the cam C³, holds the whippers above and out of contact with the reel; but as soon as the said arm reaches and passes beyond the shoulder $c'$ it drops into the depression, thereby permitting the whippers to fall or be forced, as by a spring, $d^x$, applied to the shaft $C^2$, into contact with the bolting material upon the reel.

The arm $C^4$ is adjustably secured in a slotted yoke or bracket, $c^2$, attached to a collar or socket, $c^3$, which latter is fastened to the shaft $C^2$, as by a set-screw, $c^4$, whereby provision is made for adjusting the height to which the whippers shall be raised by the cams, as by changing the position of the collar $c^3$ upon the shaft $C^2$, and also for determining the proper point of application of the whippers to the sections of the reel, which last is accomplished by adjusting the arms $C^4$ in or upon the bracket $c^2$.

Unless the weight of the whippers and the connected actuated mechanism shall be sufficient to produce the desired blow or impact upon the bolting-cloth when the arm $C^4$ is permitted to drop from the shoulder of the cam, a spring should be applied to assist in impelling the whippers against the reel. Such spring is shown at $d^x$, Figs. 3, 4, and 8, consisting, essentially, of a helical spring attached at one end to the shaft $C^2$ and at the other by an adjustable clamping device to a bracket, whereby the tension of the spring may be adjusted and the blow of the whippers correspondingly varied. The same or a similar form of tension-spring may be applied to the shaft carrying the series of whippers, when mounted upon the reel, as in Fig. 5; or in lieu of a coiled spring an adjustable leaf-spring, $s'$, Fig. 7, bearing against an arm or projection, $s^2$, on the shaft $C^2$ may be employed.

The action of the whipping mechanism as thus far described will be readily understood by those skilled in the art. The cam-surfaces $C^3$ correspond in number and location with the ribs or bolting-sections. As the reel is revolved, each cam $C^3$ raises and holds the whippers elevated until the corresponding bolting-section has arrived in proper position, when the end of the arm $C^4$, by dropping into the notch or recess at the end of the cam-section, permits the whippers to be suddenly brought down and into contact with the bolting material, the force of the blow thus delivered being regulated by the adjustment of the spring and the attachment of the arm $C^4$ to the shaft $C^2$. As the reel continues to revolve, the whippers are again elevated until the next succeeding bolting-section arrives in place, when the operation is repeated, and so on for each section of the reel.

It will be observed that the arrangement of mechanism for actuating and adjusting the rods C, constituting the whippers, is such that they can be made to bear with more or less pressure upon the surface of the bolting-cloth when the arm $C^4$ is down, or they may be set at such an angle relative to the arm $C^4$ that when the end of the latter rests at the bottom of the notch or recess separating the cam-sections $C^3$ the rods C shall be held slightly above the bolting-surface, in which latter case they will be caused to swing down and into contact with the bolting-cloth by their momentum, and the vibrations of the rods being prolonged a series of quick and sharp blows will be delivered in rapid succession upon the bolting-cloth.

In order that the whipping mechanism may not be injured or disarranged if for any cause the motion of the reel should be reversed, it is desirable that some means be provided for throwing the whippers out of action as soon as the reel is rotated backward. The mechanism devised for automatically effecting this operation consists, essentially, in providing the end of the arm $C^4$ with a pivoted section or extension, D, at the point where said arm makes contact with the cam-sections.

The section D, pivoted to the arm $C^4$ at $d^2$, is formed with a shoulder, $d$, which rides upon and drops into the recesses between the cam-sections $C^3$ when the reel is rotated in the proper direction, and with a curved or extended portion, $d'$, of sufficient length to cover or bridge the space or recess between the cam-sections $C^3$. The section D is free to vibrate on its pivot $d^2$ between the stops $d^3$ and $d^4$ on the arm $C^4$.

So long as the reel continues to rotate in the right direction, the section D, with its shoulder $d$ resting upon the cam-sections $C^3$, is held up against the stop $d^3$, (see Fig. 1,) and operates as a continuation of the arm $C^4$. When, however, the motion of the reel is reversed, and the first cam-section $C^3$ is brought against the shoulder $d$ from the opposite direction, the section D will be turned down into the position shown in Fig. 2, with its curved or extended portion $d'$ resting upon the outer surfaces of the cam-sections. As the section D is thus turned, it operates to raise the arms $C^4$, and with it the whippers C, and so long as the reverse motion of the reel continues they are sustained in this position by the curved or extended portion $d'$, which rides over the recesses or spaces between the cam-sections without being actuated thereby. When, now, the reel is again started forward, the section D will be at once swung up against the stop $d^3$, with the shoulder $d$ resting upon the cam-sections, thereby bringing the whippers into position to operate upon the bolt.

As is obvious, the whipping mechanism may be mounted upon the reel and the actuating-cam upon the chest or other support without in any degree departing from the spirit of my present invention. Such a modified arrangement is illustrated in Fig. 5, wherein the shafts $C^2$, carrying the whippers C, are supported in bearings attached to the heads of the reel, there being one complete whipping mechanism to each section or panel of the reel. Each shaft is provided with an arm, E, which as the reel is revolved makes contact with a fixed cam or projection, E', alternately raising and releasing the whippers. The arms E or cam E' may, if desired, be provided with folding ends or sections *e*, which will yield when the motion of the reel is reversed and form rigid abutments when it is rotated in the right direction.

In Fig. 6 is shown a modified form of cam consisting of a piece of thin metal bent into the shape of the cam with the incline and shoulder, and secured to the top of the ribs of the reel in any suitable manner.

As is obvious, the mechanical contrivances for operating the whippers can be greatly modified and changed without departing from the spirit of my invention.

I claim as my invention—

1. In combination with the bolting-surface of a reel, a series of rods or wires attached at one end to a support and with their bodies or free ends projected above the bolting-surface, and devices, substantially such as indicated, for actuating said rods or wires to cause them to impinge against the bolting-cloth, substantially as described.

2. In combination with the reel, a series of whippers composed, essentially, of elastic rods or wires secured at one end in holders, and actuating devices for effecting the oscillation of the whippers as each panel or bolting-section of the reel is presented, substantially as described.

3. In combination with the reel such as described, a series of whippers secured to a holder at one end, and projecting laterally over the bolting-surface, substantially as described.

4. The combination, with the bolting-reel and oscillating shaft supported in bearings to one side of the bolting section or panel and the series of flexible rods or wires secured at one end to said shaft and projecting above the bolting section or panel, of a tension device applied to the shaft, to regulate the blow of the rods or wires, substantially as described.

5. In combination with the oscillating shaft mounted to one side of the bolting section or panel of the reel, the adjustable holders applied to said shaft, and the flexible rods secured at one end in said holders with their bodies in proximity to the bolting-surface, whereby the angular position and contact of the said rods or wires relative to the bolting-surface can be adjusted or varied, as and for the purpose set forth.

6. In combination with the shaft, the flexible rods constituting the whipper, the socket applied to the said shaft, the adjustable arm, and the cam, substantially as described.

7. In combination with the oscillating shaft carrying the whippers, the reel provided with the cam-sections, and the arm applied to the said shaft and provided with a relief-section or hinged bearing portion for co-operating with said cam-sections, whereby when the motion of the reel is reversed the whippers are raised and held elevated, substantially as described.

8. In combination with the reel, the shaft, the whippers carried thereby and projecting above the bolting sections or panels, the adjustable tension-spring, the radially-adjustable arm applied to said shaft, and the cam for co-operating with said arm, substantially as described.

9. In combination with the reel and the cam-sections applied thereto, a shaft mounted in bearings on the main frame and carrying an arm in contact with the said cam-sections, and a series of flexible rods or wires, constituting the whipper, supported at one end and projecting across the bolting-surface, said whippers being alternately raised and released, and thereby caused to impinge upon the bolting-surface by the oscillating movement of the shaft as derived from the cam-sections, substantially as described.

10. In combination with the reel, the oscillating actuating-shaft, the series of flexible rods or wires, each independently and adjustably applied to said shaft, with their free ends lying in proximity to the bolting-surface, substantially as described.

GEORGE S. BURNAP.

Witnesses:
G. M. TRENHOLM,
I. P. DE VEAUX, Jr.